(12) United States Patent
Fullenkamp et al.

(10) Patent No.: US 6,692,012 B2
(45) Date of Patent: Feb. 17, 2004

(54) VEHICLE DAMPER ASSEMBLY AND METHOD

(75) Inventors: Patrick H. Fullenkamp, Bellbrook, OH (US); Sebastian Kaffanke, Bytom (PL); Piotr A. Kos, Miamisburg, OH (US); Miroslaw Pajak, Witanowice (PL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/094,450

(22) Filed: Mar. 8, 2002

(65) Prior Publication Data

US 2003/0168296 A1 Sep. 11, 2003

Related U.S. Application Data

(60) Provisional application No. 60/274,438, filed on Mar. 9, 2001.

(51) Int. Cl.[7] .............................................. B60G 15/07
(52) U.S. Cl. ................................ 280/124.154; 267/179
(58) Field of Search .............................. 267/179, 220, 267/221; 280/124.154, 124.155, 124.179

(56) References Cited

U.S. PATENT DOCUMENTS

| | | | | |
|---|---|---|---|---|
| 4,822,072 A | * | 4/1989 | Preslicka et al. | ..... 280/124.154 |
| 5,342,029 A | * | 8/1994 | Carter | ................. 280/124.154 |
| 5,893,435 A | * | 4/1999 | Handke et al. | ........ 280/124.154 |
| 6,341,678 B1 | * | 1/2002 | Hoyte et al. | .......... 280/124.154 |
| 6,343,804 B1 | * | 2/2002 | Handke et al. | ........ 280/124.154 |
| 6,367,830 B1 | * | 4/2002 | Annequin et al. | ..... 280/124.154 |

* cited by examiner

Primary Examiner—Matthew C. Graham
(74) Attorney, Agent, or Firm—Scott A. McBain

(57) ABSTRACT

The invention provides a vehicle damper assembly and method of assembling the same. The vehicle damper assembly includes a damper including a reservoir tube and a stabilizer bracket operably attached to the reservoir tube. The vehicle damper assembly further includes a lower spring seat press-fit to the reservoir tube and stabilizer bracket. The vehicle damper assembly method includes providing a reservoir tube, attaching a stabilizer bracket to the reservoir tube, and press-fitting a lower spring seat to the reservoir tube and the stabilizer bracket.

16 Claims, 4 Drawing Sheets

VEHICLE DAMPER ASSEMBLY AND METHOD

RELATED APPLICATIONS

This application claims the benefit of U.S. Provisional Application No. 60/274,438, filed Mar. 9, 2001, entitled No-Weld Strut Spring Seat Attachment by Patrick H. Fullenkamp, et al.

TECHNICAL FIELD OF THE INVENTION

The present invention relates generally to vehicular suspension systems. More particularly, the invention relates to a vehicle damper assembly with a press fit lower spring seat.

BACKGROUND OF THE INVENTION

Conventional vehicle suspension systems may include dampers such as struts or coil over shocks mounted between the wheel assembly and chassis. The damper may include a spring positioned coaxially with a reservoir tube. The spring may be retained by upper and lower spring seats attached to the reservoir tube. The damper may further include a stabilizer bar bracket and mounting bracket for attachment to a stabilizer bar and vehicle knuckle, respectively. Several considerations may be made in the manner in which the lower spring seat is attached to provide a lightweight, reliable, and cost-effective strategy for spring retention.

One consideration in lower spring seat attachment relates to welding. Current damper designs may include a lower spring seat attached to the reservoir tube with a variety of welds, such as a metal active gas (MAG) arc weld. The arc weld may provide adequate spring seat attachment, but the process may have several shortcomings. For example, arc welding may increase production time (e.g., may require part rotation) and cost (e.g., welding consumables) and may require additional machinery. In addition, spatters produced by arc welding may reduce part aesthetics and overall quality (i.e., weld spatters may mar finish and eventually loosen producing noise). Accordingly, it would be desirable to attach a lower spring seat to the reservoir tube without welding.

A strategy for attaching a lower spring seat to the reservoir tube without welding is known. Some damper designs may include a press-fit lower spring seat supported by a circular protrusion (e.g., a swage) formed on the reservoir tube. The press-fit process may eliminate some of the shortcomings associated with welding. The need to shape the reservoir tube swage, however, may increase production time and cost and may require expensive swaging machinery. In addition, the design is usually limited to coil over shocks with smaller spring seats. Therefore, it would be desirable to attach a lower spring seat to the reservoir tube without a reservoir tube swage.

Another consideration in lower spring seat attachment relates to position. Current damper designs may include a lower spring seat attached to the reservoir tube just above a stabilizer bar bracket. A space may be provided between the lower spring seat and stabilizer bracket to allow adequate clearance for welding application. Minimizing the space may afford an advantageous lower spring seat vertical position and may enhance damper performance. As such, it would be desirable to position a lower spring seat proximate to the stabilizer bar bracket.

Therefore, it would be desirable to provide a vehicle damper assembly and method that overcomes the aforementioned and other disadvantages.

SUMMARY OF THE INVENTION

One aspect of the present invention provides a vehicle damper assembly. The vehicle damper assembly includes a reservoir tube and a stabilizer bracket operably attached to the reservoir tube. The assembly further includes a lower spring seat press-fit to the reservoir tube and stabilizer bracket. The stabilizer bracket may include a stabilizer bracket portion for mating with a complementary lower spring seat portion. The stabilizer bracket portion may include a flange portion adapted for insertion into the lower spring seat portion. The lower spring seat portion may include an indented portion for receiving the stabilizer bracket portion. The lower spring seat may be manufactured from a light-weight material such as a metal alloy, aluminum, titanium, or composite. The lower spring seat may be positioned in contact with a transverse portion of the stabilizer bracket for providing a supporting force. The lower spring seat may include a hub portion formed toward a spring side of the lower spring seat.

Another aspect of the invention provides a method of assembling a vehicle damper assembly. The assembly method includes providing a reservoir tube, attaching a stabilizer bracket to the reservoir tube, and press-fitting a lower spring seat to the reservoir tube and the stabilizer bracket. The lower spring seat may be positioned in a mounting orientation. A portion of the lower spring seat may be mated to a complementary portion of the stabilizer bracket. The lower spring seat may be supported with the stabilizer bracket.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
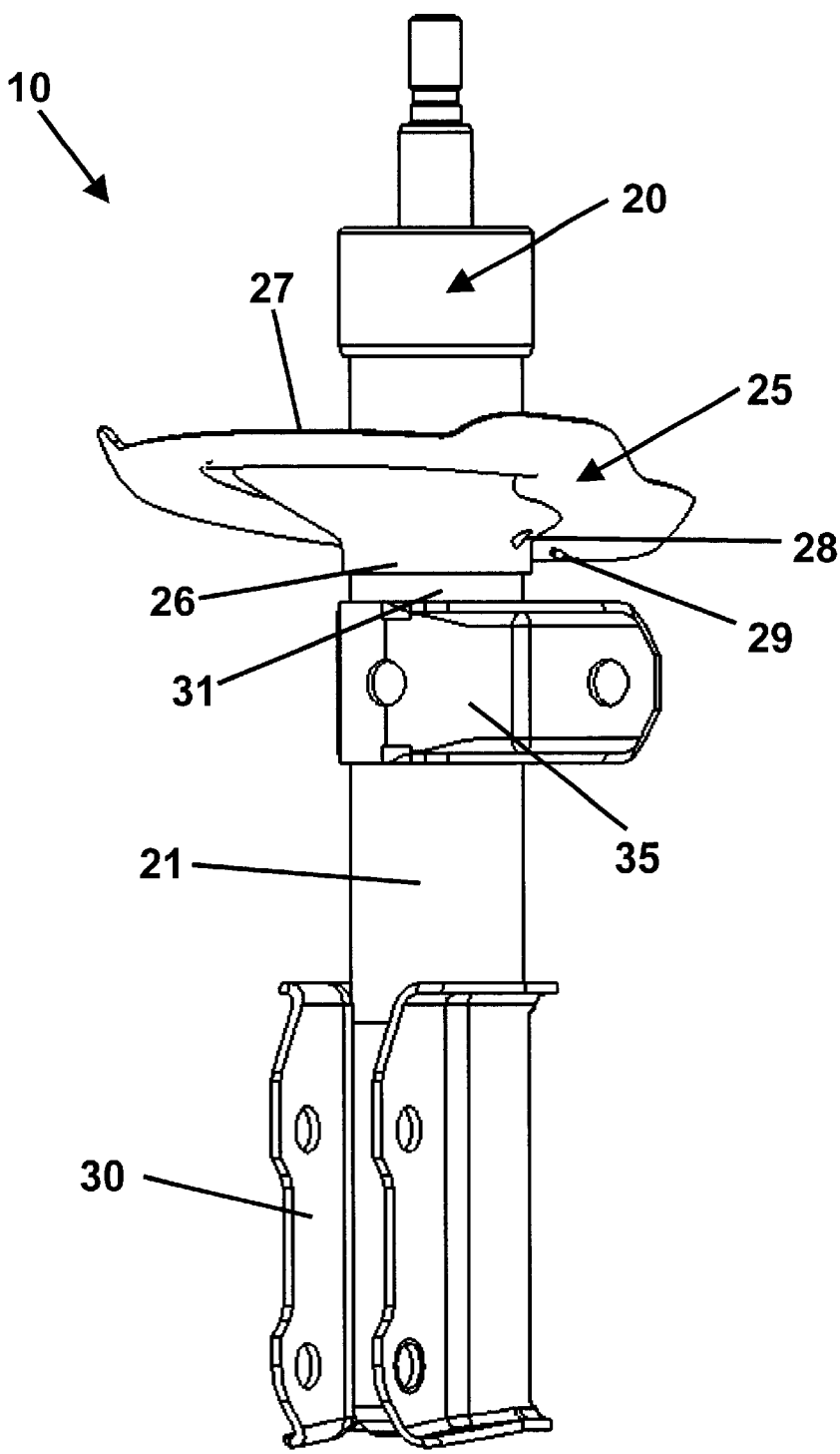
FIG. 1 is a perspective view of a portion of a prior art vehicle damper assembly.

Referring to the drawings, wherein like reference numerals refer to like elements, FIG. 1 is a perspective view of a portion of a prior art vehicle damper assembly and shown generally by numeral 10. Vehicle damper assembly 10 may include a damper 20 including a reservoir tube 21. A lower spring seat 25, a mounting bracket 30, and a stabilizer bracket 35 may be operably attached to reservoir tube 21 with a plurality of welds. Alternatively, lower spring seat 25 may be press-fit adjacent a swage (not shown) formed in the reservoir tube 21. Lower spring seat 25 may include a hub portion 26 formed away from a spring side 27 of the lower spring seat 25. A space 31 may be provided between hub portion 26 and stabilizer bracket 35 to allow a welding apparatus sufficient clearance for weld application. One or more interior drainage holes 28 may be formed in lower spring seat 25 adjacent hub portion 26 to reduce water accumulation. In addition, one or more exterior drainage holes 29 may be formed in the lower spring seat 25 for a like purpose.

Damper 20 may be one of any variety of dampers including coil-over shock absorbers, struts, or the like used for dampening vehicle suspension movements; the illustrated damper 20 is a strut. Furthermore, mounting bracket 30 may be one of any variety of brackets including one-piece or two-piece mounting brackets; the illustrated mounting bracket 30 is a two-piece mounting bracket.

Figure 2:
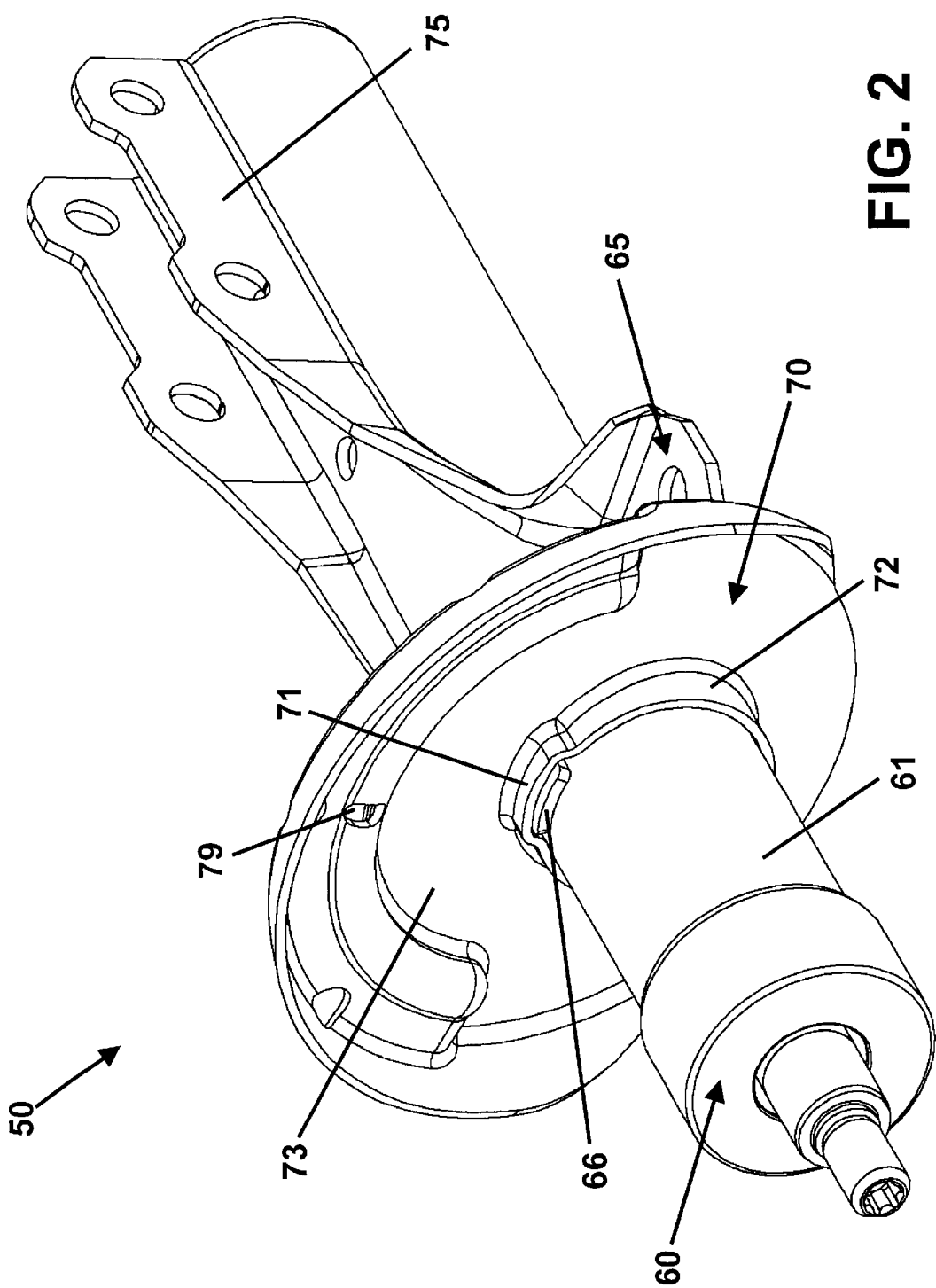
FIG. 2 is a perspective view of a portion of a vehicle damper assembly made in accordance with the present invention.

FIG. 2 is a perspective view of a portion of a vehicle damper assembly made in accordance with the present invention and shown generally by numeral 50. Vehicle damper assembly 50 includes a damper 60 including a reservoir tube 61 and a stabilizer bracket 65. Stabilizer bracket 65 may be operably attached to the reservoir tube 61. Damper 60 may be one of any variety of dampers including a coil-over shock absorber, strut, and the like used for dampening vehicle suspension movements; the illustrated damper 60 is a strut. Vehicle damper assembly 50 further includes a lower spring seat 70 press-fit to the reservoir tube 61 and stabilizer bracket 65. In the illustrated embodiment, stabilizer bracket 65 is unified with a one-piece mounting bracket 75.

Figure 3:
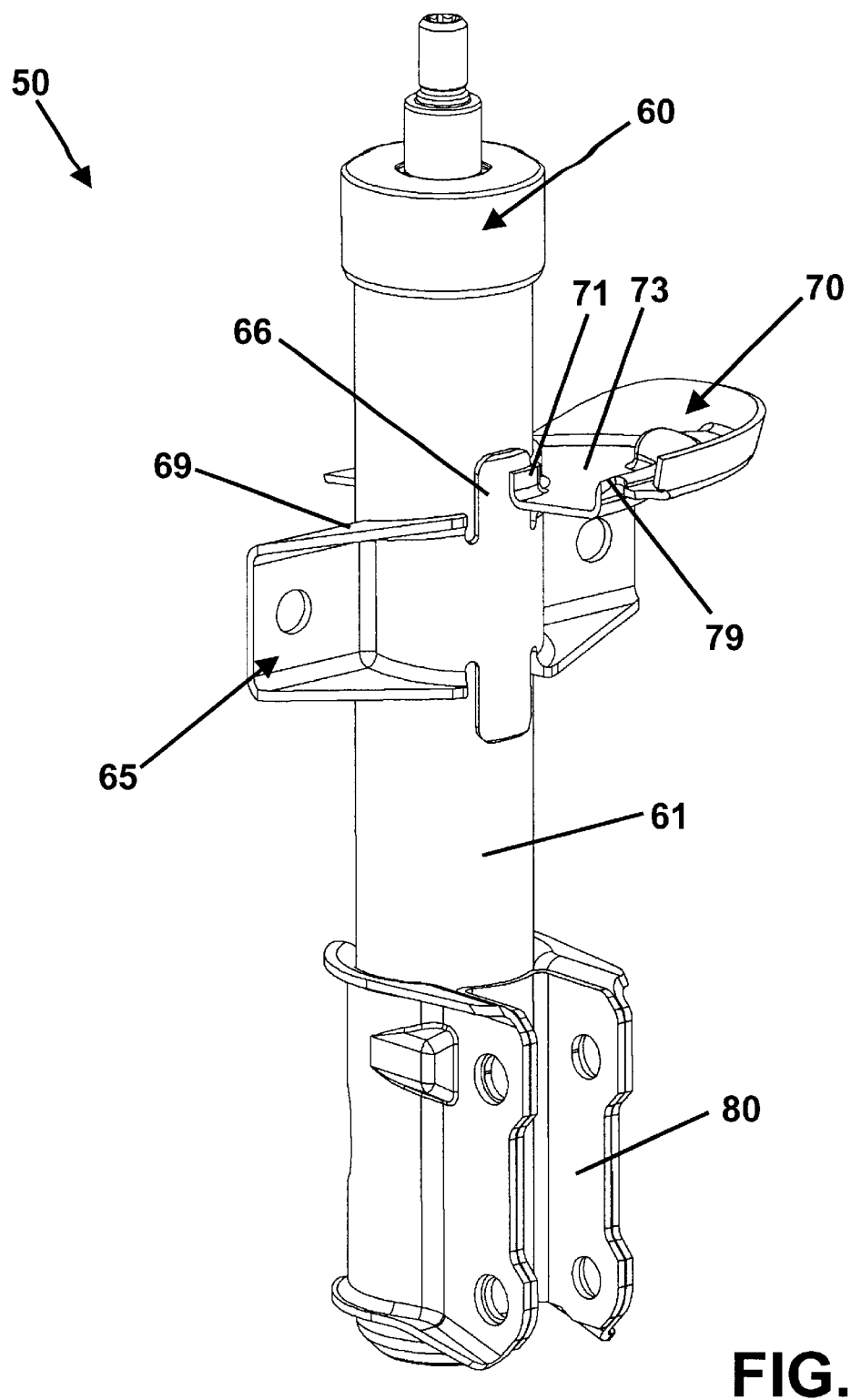
FIG. 3 is a cut-away perspective view of a portion of a vehicle damper assembly made in accordance with the present invention.

In another embodiment, stabilizer bracket 65 need not be unified with the mounting bracket. As shown in FIG. 3, a cut-away perspective view, stabilizer bracket 65 is a separate entity from a two-piece mounting bracket 80. Those skilled in the art will recognize that a variety of mounting bracket designs may be incorporated for use with the present invention. The stabilizer bracket 65 and mounting bracket 75, 80 may be operably attached to the reservoir tube 61 with any number of attachment means recognized in the art (e.g., linear welds, arc welds, and the like).

Referring to both FIGS. 2 and 3, stabilizer bracket 65 may include a stabilizer bracket 65 portion for mating with a complementary lower spring seat 70 portion. In one embodiment, stabilizer bracket 65 portion may include a flange portion 66 adapted for insertion into the lower spring seat 70 portion. Lower spring seat 70 portion may include an indented portion 71 for receiving stabilizer bracket 65 portion. In another embodiment, lower spring seat may include a flange portion adapted for insertion into an indented stabilizer bracket portion. Those skilled in the art will recognize that a variety of complementary mating portion designs may be adapted for use with the present invention.

Lower spring seat 70 may include a hub portion 72 formed toward a spring side 73 of the lower spring seat 70. For example, hub portion 72 may be formed substantially in an opposing direction to prior art lower spring seat 25 hub portion 26 (refer also to FIG. 1). This feature may allow lower spring seat 70 to be positioned in contact with the stabilizer bracket 65. As such, a transverse portion 69 of the stabilizer bracket 65 may provide a supporting force to the lower spring seat 70. The press-fit and supporting force provide redundant support features and may reduce lower spring seat 70 failure rate. Lower spring seat 70 may include one or more exterior drainage holes 79 to reduce water accumulation. Since hub portion 72 may be formed toward spring side 73, water may not accumulate adjacent reservoir tube 61. As such, lower spring seat 70 need not have interior drainage holes. This may increase lower spring seat 70 integrity and reduce manufacture time and cost.

Vehicle damper assembly 50 components, namely reservoir tube 61, stabilizer bracket 65, and mounting bracket 75, 80, may be manufactured from a sufficiently rigid material such as metal (e.g., low carbon steel), metal alloy, or the like. Since lower spring seat 70 does not require welding attachment, materials generally not compatible with welding procedures may be utilized. Accordingly, lower spring seat 70 may be manufactured from a light-weight material such as a metal alloy, aluminum, titanium, or composite (e.g., carbon fiber) thereby reducing vehicle damper assembly 50 mass.

Figure 4:
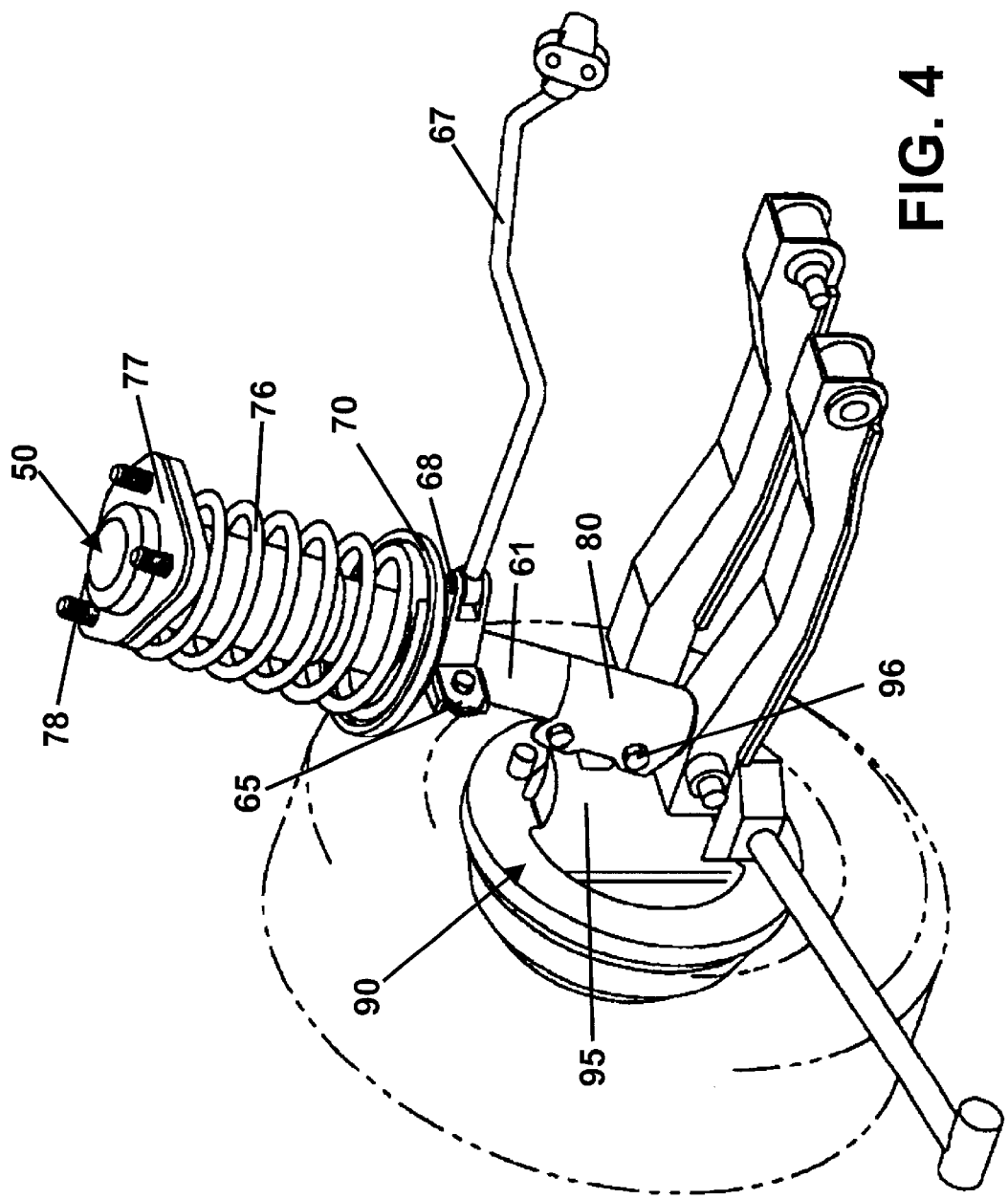
FIG. 4 is a perspective view of a vehicle damper assembly mounted to a vehicle knuckle and made in accordance with the present invention.

FIG. 4 is a perspective view of vehicle damper assembly 50 mounted to a vehicle wheel assembly 90 and made in accordance with the present invention. Vehicle damper assembly 50 may include a spring 76 positioned coaxially with the reservoir tube 61 and retained between an upper spring seat 77 and the lower spring seat 70. Vehicle damper assembly 50 may be attached to a vehicle chassis (not shown). In one embodiment, one or more bolts 78 positioned through openings formed in the upper spring seat 77 may provide attachment means to the vehicle chassis. A stabilizer bar 67 may be attached to the stabilizer bracket 65. In one embodiment, a bolt 68 may provide pivoting attachment means between the stabilizer bracket 65 and stabilizer bar 67. Vehicle damper assembly 50 may be mounted to the vehicle wheel assembly 90 at a vehicle knuckle 95. In one embodiment, mounting bracket 80 may be attached to the vehicle knuckle 95 with a plurality of bolts 96. The bolts 68, 78, and 96 may be secured with one or more threaded nuts (not shown). Those skilled in the art will recognize that a number of attachment means may be utilized to attach vehicle damper assembly 50 to the vehicle chassis, vehicle wheel assembly 90, and stabilizer bar 67.

Assembly of the vehicle damper assembly 50 may begin by positioning stabilizer bracket 65 and mounting bracket 75, 80 on the reservoir tube 61. Positioning may vary depending on vehicle damper assembly 50 and vehicle design. Stabilizer bracket 65 and mounting bracket 75, 80 may then be attached to the reservoir tube 61. In one embodiment, stabilizer bracket 65 and mounting bracket 75, 80 may be attached to the reservoir tube 61 with one or more welds, such as linear and/or arc welds. Preferably, linear welds may be used eliminating the need for part rotation and arc welding machinery. Those skilled in the art will recognize that a number of attachment means may be utilized to attach stabilizer bracket 65 and mounting bracket 75, 80 to the reservoir tube 61.

Lower spring seat 70 may then be positioned onto the reservoir tube 61. In one embodiment, the mating of complementary flange portion 65 and indented portion 71 may aid in a proper mounting orientation of the lower spring seat 70. In addition, lower spring seat 70 may be positioned in contact with stabilizer bracket to provide the supporting force. Positioning the lower spring seat 70 in contact with the stabilizer bracket 65 minimizes the space 31 size (refer also to FIG. 1). Minimal space 31 size provides a smaller angle between the stabilizer bar link and vehicle vertical axis. As such, the smaller angle may afford advantageous lower spring seat 70 vertical position and enhance vehicle damper assembly 50 performance.

Lower spring seat 70 may then be press-fit to the reservoir tube 61 and stabilizer bracket 65. In one embodiment, the press-fit may be applied around the hub portion 72 of the lower spring seat 70 thereby providing attachment. The hub portion 72 and complementary stabilizer bracket and lower spring seat portions 65, 70 may be pressed into contact with the reservoir tube. In one embodiment, the press-fit may be formed by a press-fit machine. The press-fit eliminates the need for spring seat welding machinery and a weld application step. As such, production time and cost may be reduced while improving part quality and aesthetics (e.g., reduction of weld splatters).

While the embodiments of the invention disclosed herein are presently considered to be preferred, various changes and modifications can be made without departing from the spirit and scope of the invention. For example, the lower spring seat and stabilizer bracket configurations, and the vehicle damper assembly method are not limited to any particular design or sequence. Specifically, the complementary stabilizer bracket and lower spring seat portions configuration, hub orientation, nature of the damper, and assembly step order may vary without limiting the utility of the invention. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A damper assembly comprising:
   a damper including a reservoir tube;
   a stabilizer bracket operably attached to the reservoir tube; and
   a lower spring seat press-fit to the reservoir rube and stabilizer bracket; wherein the stabilizer bracket comprises a stabilizer bracket portion for mating with a complementary lower spring seat portion.

2. The assembly of claim 1 wherein the stabilizer bracket portion comprises a flange portion adapted for insertion into the lower spring seat portion.

3. The assembly of claim 1 wherein the lower spring seat portion comprises an indented portion for receiving the stabilizer bracket portion.

4. The assembly of claim 1 wherein the lower spring seat comprises a light-weight material selected from a group consisting of a metal alloy, aluminum, titanium, and composite.

5. The assembly of claim 1 wherein the lower spring seat is positioned in contact with a transverse portion of the stabilizer bracket for providing a supporting force.

6. The assembly of claim 1 wherein the lower spring seat comprises a hub portion formed toward a spring side of the lower spring sear.

7. A damper assembly comprising:
   a damper including a reservoir tube;
   a stabilizer bracket operably attached to the reservoir tube: and
   a lower spring sear press-fit to the reservoir tube and stabilizer bracket; wherein the lower spring sear comprises a hub portion formed toward a spring side of the lower spring seat.

8. The assembly of claim 7 wherein the stabilizer bracket comprises a stabilizer bracket portion for mating with a complementary lower spring seat portion.

9. The assembly of claim 8 wherein the stabilizer bracket portion comprises a flange portion adapted for insertion into the lower spring sear portion.

10. The assembly of claim 8 wherein the lower spring sear portion comprises an indented portion for receiving the stabilizer bracket portion.

11. The assembly of claim 7 wherein the lower spring seat comprises a light-weight material selected from a group consisting of a metal alloy, aluminum, uranium, and composite.

12. A method of assembling a damper assembly, comprising:
    providing a reservoir tube;
    attaching a stabilizer bracket to the reservoir tube;
    positioning a lower spring seat in a mounting orientation;
    mating a portion of the lower spring seat to a complementary portion of the stabilizer bracket; and
    press-fitting the lower spring seat to the reservoir tube and the stabilizer bracket.

13. The method of claim 12 wherein press-fitting the lower spring seat comprises supporting the lower spring seat with the stabilizer bracket.

14. A method of assembling a damper assembly, comprising:
    providing a reservoir tube;
    attaching a stabilizer bracket to the reservoir tube;
    press-fitting a lower spring seat to the reservoir tube and the stabilizer bracket; and
    supporting the lower spring seat with the stabilizer bracket.

15. The method of claim 14 wherein press-fitting the lower spring seat comprises positioning the lower spring seat in a mounting orientation.

16. The method of claim 15 wherein positioning the lower spring seat in a orientation composes mating a portion of the lower spring seat to a complementary portion of the stabilizer bracket.

* * * * *